(12) United States Patent
Lille

(10) Patent No.: US 6,956,716 B2
(45) Date of Patent: Oct. 18, 2005

(54) MAGNETIC HEAD HAVING MULTILAYER HEATER FOR THERMALLY ASSISTED WRITE HEAD AND METHOD OF FABRICATION THEREOF

(75) Inventor: Jeffrey S. Lille, Sunnyvale, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 146 days.

(21) Appl. No.: 10/631,396

(22) Filed: Jul. 30, 2003

(65) Prior Publication Data

US 2005/0024773 A1 Feb. 3, 2005

(51) Int. Cl.$^7$ .............................................. G11B 5/147
(52) U.S. Cl. ...................................................... 360/126
(58) Field of Search .............................. 360/126, 125, 360/128, 313

(56) References Cited

U.S. PATENT DOCUMENTS

| | | | |
|---|---|---|---|
| 4,296,309 A | * 10/1981 | Shinmi et al. | 347/204 |
| 4,670,732 A | 6/1987 | Church | 338/32 R |
| 5,450,263 A | 9/1995 | Desaigoudar et al. | 360/110 |
| 5,585,983 A | 12/1996 | Sugiyama | |
| 5,805,382 A | 9/1998 | Lee et al. | |
| 6,054,330 A | * 4/2000 | Phipps et al. | 438/3 |
| 6,233,206 B1 | * 5/2001 | Hamann et al. | 369/13.01 |
| 6,349,021 B1 | * 2/2002 | Honda | 360/317 |
| 6,359,752 B1 | * 3/2002 | Imamura | 360/234.7 |
| 6,822,819 B1 | * 11/2004 | Gillis et al. | 360/59 |
| 2002/0191326 A1 | * 12/2002 | Xu et al. | 360/75 |
| 2003/0035237 A1 | * 2/2003 | Lille | 360/77.07 |
| 2004/0027709 A1 | * 2/2004 | Hamaguchi et al. | 360/59 |
| 2004/0027728 A1 | * 2/2004 | Coffey et al. | 360/313 |
| 2004/0114268 A1 | * 6/2004 | Satoh et al. | 360/75 |
| 2004/0165305 A1 | * 8/2004 | Nishiyama | 360/75 |

FOREIGN PATENT DOCUMENTS

JP     3104008     5/1991

OTHER PUBLICATIONS

U.S. Appl. No. 09/608,848, filed Jun., 29, 2000, Kasiraj et al.
IBM Technical Disclosure bulletin, vol. 39, No. 06, Jun. 1996; entitled: Self–Cleaning Magnetic Recording Slider.

* cited by examiner

*Primary Examiner*—Allen Cao
(74) *Attorney, Agent, or Firm*—Robert O. Guillot; Intellectual Property Law Offices

(57) ABSTRACT

A magnetic head including a media heating device that is fabricated within the magnetic head structure. The media heating device is fabricated with diffusion barrier layers and/or adhesion layers beneath the heating device layers, between heating device layers and/or above the heating device layers. A diffusion barrier layer prevents the diffusion of the metal materials that comprise the heating device layers into layers that are disposed below and/or above the heating device, and adhesion layer promotes adhesion of the heating device to the magnetic head layers adjacent to the heating device. The diffusion barrier layer may be comprised of tantalum, tantalum nitride, other tantalum alloys, titanium, rhodium and ruthenium, and the adhesion layer may be comprised of tantalum, tantalum nitride, tantalum oxide, other tantalum alloys, titanium, nickel iron, chromium, platinum alloys, nickel alloys and aluminum oxide.

24 Claims, 3 Drawing Sheets

MAGNETIC HEAD HAVING MULTILAYER HEATER FOR THERMALLY ASSISTED WRITE HEAD AND METHOD OF FABRICATION THEREOF

BACKGROUND OF THE INVENTION

1. Field of the Invention

The present invention relates generally to magnetic heads that are utilized with thin film hard disk data storage devices, and more particularly to the design and fabrication of a magnetic head having a storage media heating device formed within the magnetic heads.

2. Description of the Prior Art

As is well known to those skilled in the art, standard magnetic heads include write head elements that include two magnetic poles, commonly termed the P1 and P2 poles. During a data recording procedure, the passage of magnetic flux between the two poles creates a magnetic field which influences a thin film layer of magnetic media on a hard disk that is located proximate the magnetic head, such that the changing magnetic flux creates data bits within the magnetic media.

The continual quest for higher data recording densities of the magnetic media demands smaller bit cells, in which the volume of recording material (grains) in the cells is decreased and/or the coercivity (Hc) is increased. When the bit cell size is sufficiently reduced, the problem of the superparamagnetic limit will provide a physical limit of the magnetic recording areal density. A present method to delay the onset of this limit in storage media is the use of a thermally assisted recording head in which a heating device is disposed within the magnetic head. Heat from the heating device is directed to the storage media, and it temporarily reduces the localized coercivity of the media, such that the magnetic head is able to record data bits within the magnetic media. Once the media returns to ambient temperature, the very high coercivity of the media provides the bit latency necessary for the recorded data.

A problem in creating such heating devices within magnetic heads is that the materials forming the heating device can diffuse into adjacent magnetic head components, and/or can have poor adhesive characteristics which cause delamination with adjacent head components. There is therefore a need to prevent such heating devices from creating unwanted diffusion and delamination problems subsequent to their fabrication.

SUMMARY OF THE INVENTION

A magnetic head of the present invention includes a media heating device that is fabricated within the magnetic head structure following the fabrication of the read head component of the magnetic head. The media heating device serves to heat the magnetic media immediately prior to the passage of the magnetic media beneath the write pole tip of the magnetic head. Heating the media lowers its localized coercivity, and facilitates the writing of data to the media by the write head of the magnetic head.

The improved media heating device of the present invention is fabricated with diffusion barrier layers and/or adhesion layers beneath the heating device layers, between heating device layers and/or above the heating device layers. Where diffusion barrier layers are utilized, they prevent the diffusion of the metal materials that comprise the heating device layers from diffusing into layers that are disposed below and/or above the heating device, and a diffusion barrier layer may also be deposited between layers of the heating device to prevent diffusion between those layers as well. Where an adhesion layer is deposited below, between and/or above the heating device layers it promotes adhesion of the heating device to the magnetic head layers adjacent to the heating device, to prevent delamination of the layers of the magnetic head. Following the fabrication of the media heating device with the diffusion barrier and/or adhesion layers, further head components, such as write head induction coils and magnetic poles are fabricated to complete the fabrication of the magnetic head.

In a preferred embodiment, the heating device includes an electrically resistive heating element, and diffusion barrier and/or adhesion layers are fabricated beneath/within and above the heating element. The heating element is typically comprised of NiCr, CrV or NiFe, and the diffusion barrier layer may be comprised of tantalum, tantalum nitride, other tantalum alloys, titanium, rhodium and ruthenium, and the adhesion layer may be comprised of tantalum, tantalum nitride, tantalum oxide, other tantalum alloys, titanium, nickel iron, chromium, platinum alloys, nickel alloys, and aluminum oxide. Where a diffusion barrier layer or adhesion layer is disposed within the heating device it is preferably composed of an electrically conductive material.

It is an advantage of the magnetic head of the present invention that it includes an improved media heating device to facilitate the writing of data to a magnetic disk.

It is another advantage of the magnetic head of the present invention that it includes one or more diffusion barrier layers that are fabricated above and/or below the media heating device to prevent diffusion of the media heating device material into adjacent magnetic head components.

It is a further advantage of the magnetic head of the present invention that it includes one or more adhesion layers that are fabricated above and/or below the media heating device to promote adhesion of the media heating device material with adjacent magnetic head components.

It is an advantage of the hard disk drive of the present invention that it includes a magnetic head that includes an improved media heating device to facilitate the writing of data to a magnetic disk.

It is another advantage of the hard disk drive of the present invention that it includes a magnetic head that includes one or more diffusion barrier layers that are fabricated above and/or below a media heating device to prevent diffusion of the media heating device material into adjacent magnetic head components.

It is a further advantage of the hard disk drive of the present invention that it includes a magnetic head that includes one or more adhesion layers that are fabricated above and/or below a media heating device to promote adhesion of the media heating device material with adjacent magnetic head components.

These and other features and advantages of the present invention will no doubt become apparent to those skilled in the art upon reviewing the following detailed description which makes reference to the several figures of the drawings.

IN THE DRAWINGS

The following drawings are not made to scale of an actual device, and are provided for illustration of the invention described herein.

DETAILED DESCRIPTION OF THE PREFERRED EMBODIMENTS

Figure 1:
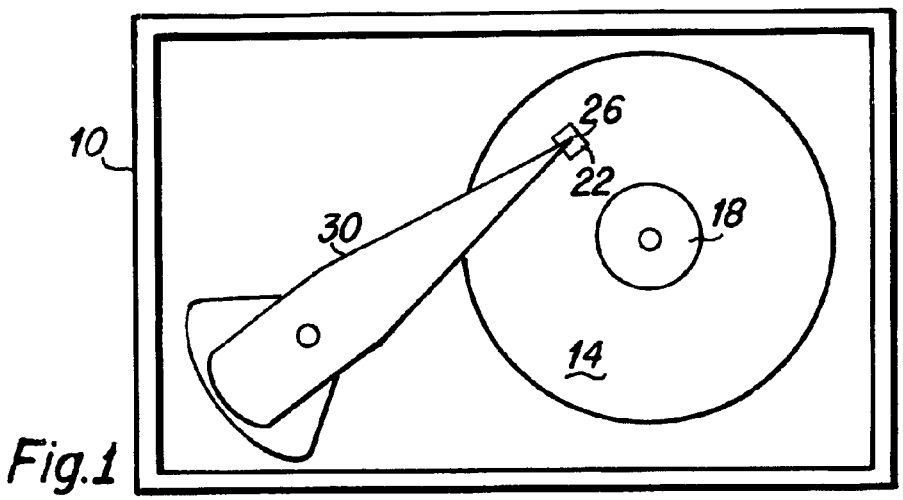
FIG. 1 is a schematic top plan view of a hard disk drive including the magnetic head of the present invention.

Efforts to increase areal data storage density of hard disk drives have lead to improvements in the structure and function of the write head elements of magnetic heads. A simplified top plan view of a typical hard disk drive 10 which is suitable to include the magnetic head of the present invention is presented in FIG. 1. As depicted therein, at least one hard disk 14 is rotatably mounted upon a motorized spindle 18. A slider 22, having a magnetic head 26 formed thereon, is mounted upon an actuator arm 30 to fly above the surface of each rotating hard disk 14, as is well known to those skilled in the art. The present invention includes improved features and manufacturing methods for such magnetic heads 26, and to better described the present invention a prior art magnetic head is next described.

Figure 2:
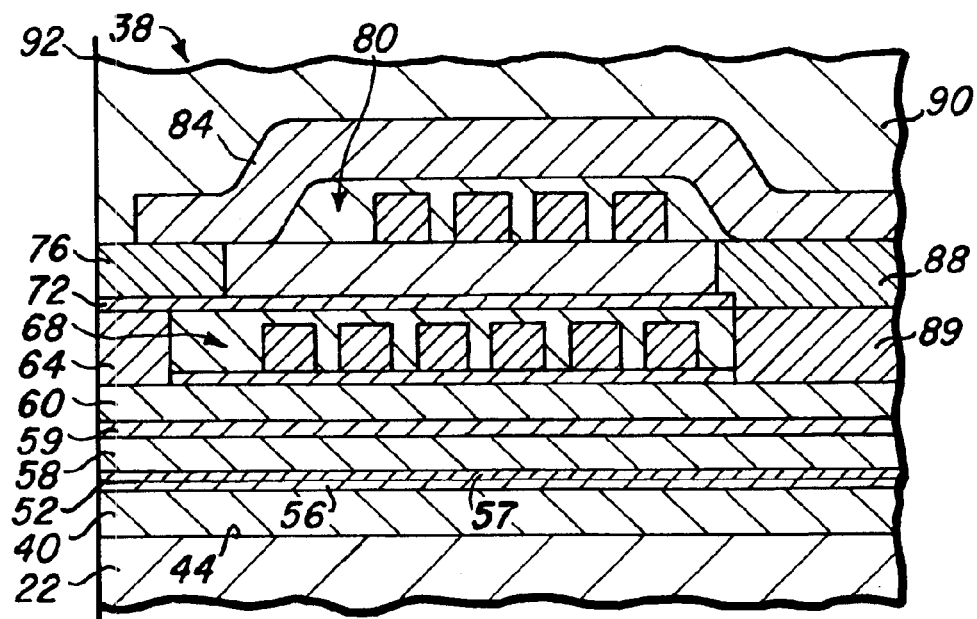
FIG. 2 is a side cross-sectional view depicting various components of a prior art magnetic head.

As will be understood by those skilled in the art, FIG. 2 is a side cross sectional view depicting portions of a prior art magnetic head 38. The magnetic head 38 includes a first magnetic shield layer (S1) 40 that is formed upon a surface 44 of the slider body material 22. A read head sensor element 52 is disposed within insulating layers 56 and 57, and a second magnetic shield layer (S2) 58 is formed upon the upper insulation layer 57. An insulation layer 59 is then deposited upon the S2 shield 58, and a first magnetic pole (P1) 60 is fabricated upon the insulation layer 59.

Following the fabrication of the P1 pole layer 60, a P1 pole pedestal 64 may be fabricated upon the P1 pole layer 60, and a first induction coil layer 68 is fabricated above the P1 pole layer 60 within the layer that includes the P1 pole pedestal 64. Thereafter, a write gap layer 72 is deposited, followed by the fabrication of a P2 magnetic pole tip 76. A second induction coil layer 80 may be fabricated above the layer containing the P2 pole tip 76. A yoke portion 84 of the second magnetic pole is next fabricated in magnetic connection with the P2 pole tip 76, and through back gap elements 88 and 89 to the P1 pole layer 60. The head is subsequently encapsulated in alumina 90, and it is finally processed such that an air bearing surface (ABS) 92 is created. It is to be understood that this description omits many detailed fabrication steps that are well known to those skilled in the art, and which are not deemed necessary to describe herein in order to provide a full understanding of the present invention.

As has been indicated hereabove, the present invention is a magnetic head including a heating device that provides thermal assistance in recording data bits to high coercivity magnetic media. As will be understood from the following detailed description, the magnetic head of the present invention includes an improvement in the resistive heating device fabrication process, where the heating device can be disposed at different locations within the head. For ease of description, this application describes in detail a heating device that is fabricated beneath the P1 pole pedestal 64 and above the P1 pole layer 60; however it is not to be limited to that location. Also, the location and fabrication of other head elements, such as the induction coils, may be varied, and the present invention is not to be limited to the number or location of elements such as the induction coil. The fabrication of a heating device within a magnetic head 26 of the present invention is next described.

Figure 3:
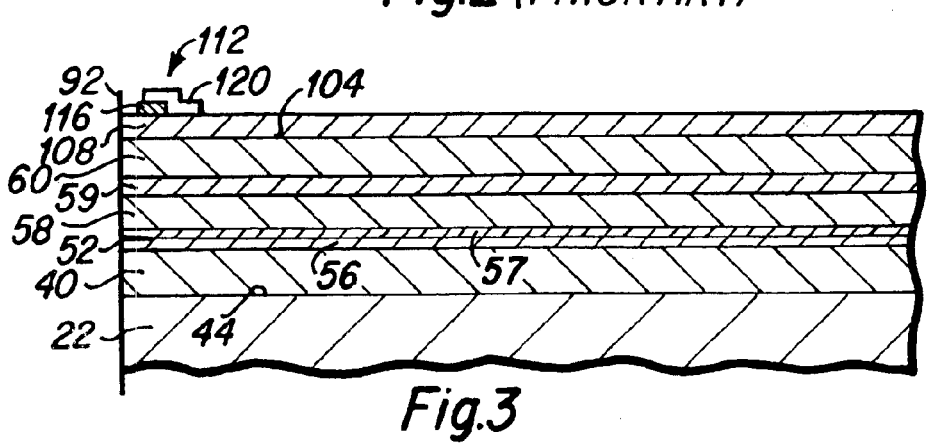
FIGS. 3 is a side cross-sectional view depicting an initial process step for fabricating a magnetic head of the present invention.

FIG. 3 depicts a fabricated read head portion of the magnetic head 26. As with the prior art head depicted in FIG. 2, it includes a first magnetic shield layer 40, a read head sensor element 52 and a second magnetic shield layer 58. It is therefore to be understood that the magnetic head of the present invention makes no significant changes in the fabrication of the read head portion of the magnetic head. Additionally, as is well known to those skilled in the art, in an alternative magnetic head design the S2 shield 58 also serves as a first magnetic pole, in which case the insulation layer 59 is not fabricated. This alternative magnetic head design is termed a merged magnetic head, and the heating device of the present invention can be fabricated above the shield/pole 58 of a merged magnetic head in the same manner as it is fabricated in the piggyback magnetic head design that is described in detail herein.

As depicted in FIG. 3, following the fabrication of the P1 pole layer 60, a chemical mechanical polishing (CMP) step is preferably undertaken to obtain a smooth surface 104 upon which to fabricate further structures of the magnetic head. An insulation layer 108, that is preferably comprised of alumina or $SiO_2$, is next deposited upon the surface 104 of the P1 layer 60. The insulation layer 108 provides electrical insulation of the heating device described herebelow from the P1 pole layer 60.

Figure 4:
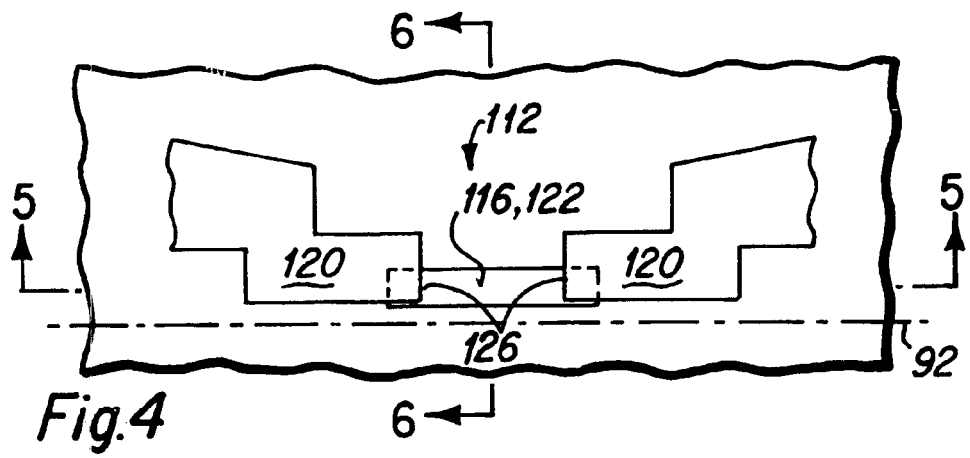
FIG. 4 is a top plan view depicting a media heating device as may be fabricated within the magnetic head of the present invention.

The heating device 112 is next fabricated on top of the insulation layer 108, and FIG. 4 is a top plan view of such a heating device. As is depicted in FIG. 4, the heating device 112 may be fabricated using well known photolithographic techniques in which heating device components including an electrically resistive heater element layer 116 and electrical leads 120 of the heating device 112 are fabricated. A detailed description of the fabrication of such a heating device is provided in U.S. patent application Ser. No. 10/791,186, filed Mar. 1, 2004, entitled: Magnetic Head Having Thermally Assisted Recording Device, and Method of Fabrication Thereof, the disclosure of which is incorporated herein as though set forth in full. Basically, the heating device 112 includes a central electrically resistive heating element portion 122 of the heating element layer 116 that is located between the inner ends 126 of the electrical leads 120, and fabricated beneath the location in which the write head pole tip will subsequently be fabricated. It is desirable though not necessary that the active central heating element portion 122 be approximately as wide as the track width of the pole tip because it is generally undesirable to heat portions of the magnetic media disposed on data tracks that are adjacent to the track that is being written upon. It is also desirable, though not necessary, that the heating device 112 be fabricated slightly away from the air bearing surface (ABS) 92 of the head, to limit corrosion of the heating device and to avoid possible electrical discharge from the heating device 112 to the media disk during a writing operation.

Figure 5:
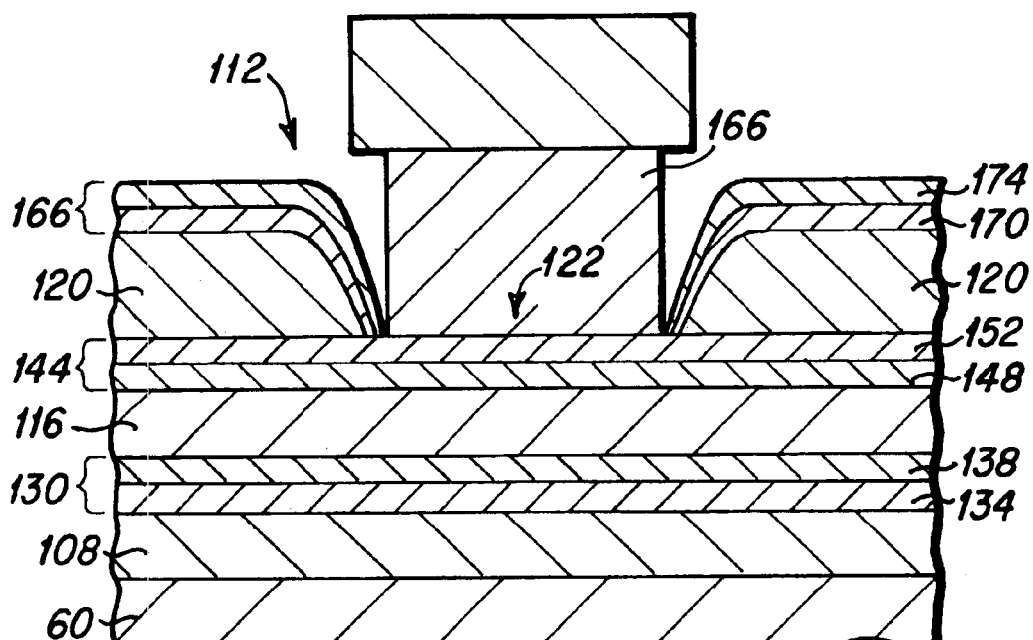
FIGS. 5–7 are side cross-sectional views depicting successive process steps for fabricating a magnetic head of the present invention.

A close up cross-sectional view of the heating element and lead ends is provided in the cross sectional view of FIG. 5 which is taken in the direction of lines 5—5 of FIG. 4. As is seen in FIGS. 4 and 5, the heating element layer 116 may be fabricated first, followed by the electrical leads 120 that are deposited on top of the heating element layer 116.

In a method for creating a heating device 112 of the present invention, a heating device underlayer 130 is first deposited, full film, across the surface of the wafer upon the insulation layer 108. The underlayer 130 may include an adhesion layer 134, a diffusion barrier layer 138, both layers, or a single layer that acts as both a diffusion barrier and an adhesion layer. A diffusion barrier layer is particularly desirable where the insulation layer 108 is comprised of $SiO_2$ in that the metallic material that will comprise the heater element layer 116 and/or the electrical lead layers 120 of the heating device may otherwise diffuse into the $SiO_2$ insulation layer 108 and adversely affect its insulative properties. Additionally, an adhesion layer is desirable where the metallic materials that comprise the heater element layer 116 and/or lead layers 120 of the heating device may adhere poorly to the insulation layer 108. Suitable diffusion barrier layer materials are tantalum, tantalum nitride, other tantalum alloys, titanium, rhodium and ruthenium, and suitable adhesion layer materials are tantalum, tantalum nitride, tantalum oxide, other tantalum alloys, titanium, nickel iron, chromium, platinum alloys, nickel alloys and aluminum oxide. It can therefore be seen that materials that will act as both diffusion barriers and adhesion layers are tantalum, tantalum nitride, other tantalum alloys and titanium. A diffusion barrier layer will typically have a thickness in the range of 1–5 nm, and an adhesion layer will typically have a thickness range of 1–5 nm.

Following the deposition of the underlayer 130, the thin film heating element layer 116 is deposited across the wafer surface. Following the deposition of the heating element layer 116, a mid-layer 144 that may include a diffusion barrier layer 148 and/or an adhesion layer 152 may be deposited upon the heater element layer 116. The mid-layer 144 will be disposed primarily between the heater element layer 116 and the electrical lead layers 120, to act as a diffusion barrier between the heater element layer 116 and the electrical leads 120, and/or to promote adhesion between the heater element layer 116 and the electrical leads 120 that are subsequently deposited. The mid-layer 144 must be comprised of an electrically conductive material to permit electrical current to pass from the leads 120 through the heating element portion 122.

As is depicted in FIG. 5, the central portion 122 of the heating element layer 116 (with mid-layer 144 deposited thereon) is next protected by a mask 160 during the fabrication of the electrical leads 120. Electrical lead material is next deposited full film across the surface of the wafer upon the mid-layer 144. The electrical lead material may typically include rhodium, copper, or other commonly used electrical lead materials.

Following the deposition of the electrical lead material, an over-layer 166 that may include a diffusion barrier layer 170 and/or an adhesion layer 174, is deposited full film across the surface of the wafer upon the electrical lead layer 120. The over-layer 166 serves to prevent diffusion of the electrical lead material into subsequently fabricated components and/or to provide enhanced adhesion of subsequently fabricated components to the electrical lead material.

Figure 6:
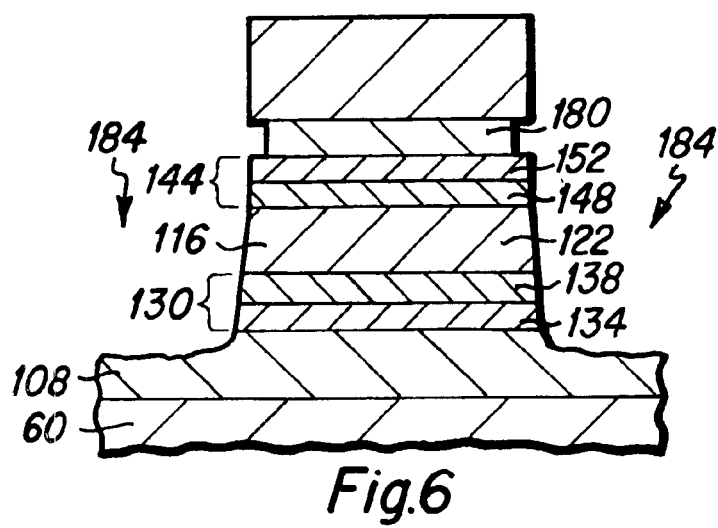

Thereafter, the mask 160 is removed and, as shown in FIG. 6, a mask 180 in the shape of the footprint of the electrical leads (the footprint being shown in the top view of FIG. 4) is formed upon the over-layer 166 and upon the mid-layer 144 in the central portion 122 of the heating device 112. FIG. 6 is a side cross-sectional view of the heating device 112, taken long lines 6—6 of FIG. 4 that depicts the removal of the field material and the protection of the heating device 112 by the mask 180. An ion milling or sputter etching step is next conducted in which the over-layer 166, electrical lead material 120, mid-layer 144, heating element material 116 and the under-layer 130, in the field 184 that are unprotected by the mask 180 are removed.

Figure 7:
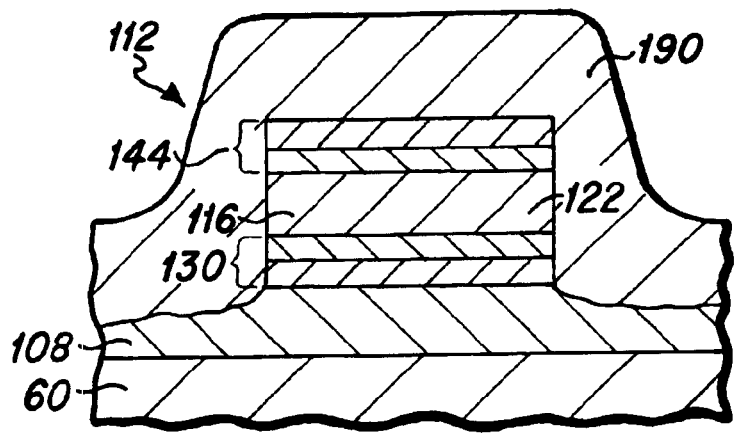

Thereafter, as depicted in FIG. 7, the mask 180 is removed, exposing the surface of the mid-layer 144 in the center of the heating device 112 and the over-layer 166 above the electrical leads 120. An electrical insulation layer 190, preferably composed of alumina or $SiO_2$, is next deposited full film across the surface of the wafer. A desirable thickness for the insulation layer 190 is approximately 250 Å.

Alternate uses of the adhesion and diffusion barriers with the use of a heating element in a head may be where an optical heating element is incorporated into the head. It is commonly known that an optical component such as a laser can be used to heat the media to facilitate writing media with large coercivity. To implement this type of heating, various optical elements would be used in or on the head. The elements such as waveguides, lenses, and coupling devices may advantageously use these aforementioned adhesion and diffusion layers adjacent to these said optical elements. These elements may be heated with photons or their optical properties may be sensitive to contamination from adjacent materials; hence, there is a need to include these layers with such optical elements.

Figure 8:
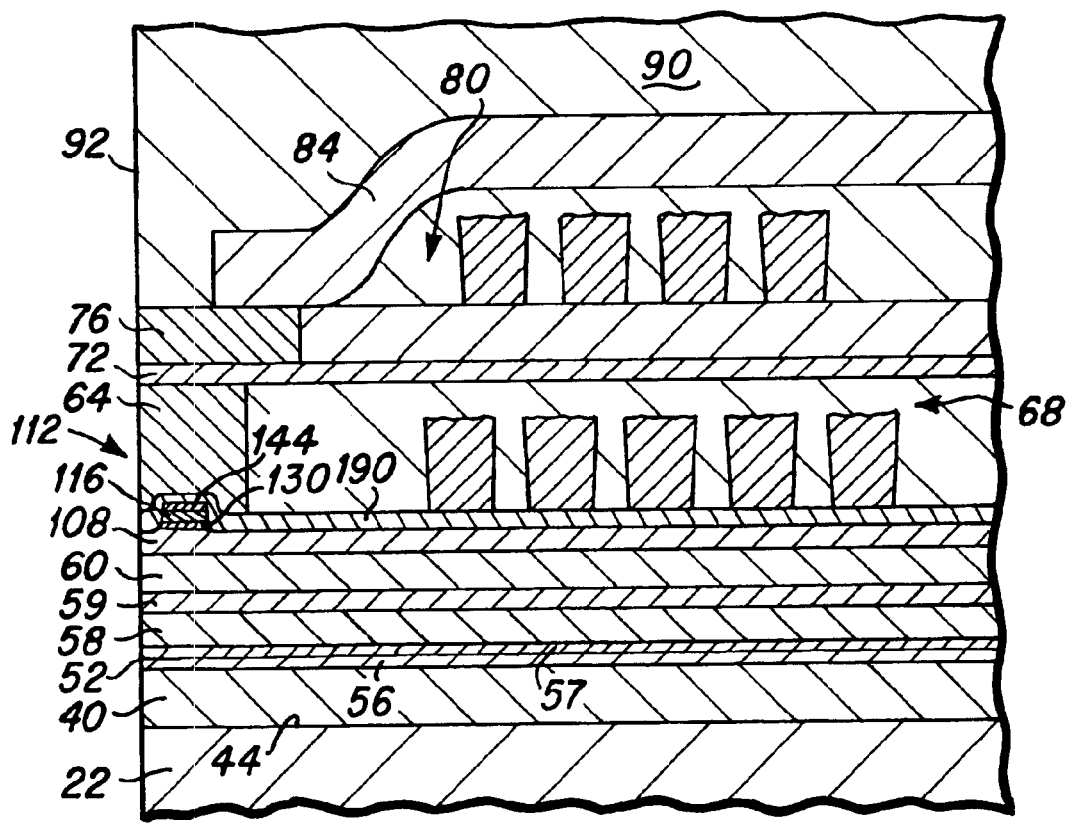
FIG. 8 is a side cross-sectional view depicting a completed magnetic head of the present invention.

As is next depicted in FIG. 8, further magnetic head components including an induction coil 68 and a second magnetic pole 84 are subsequently fabricated to complete the manufacture of the magnetic head 26. The steps for fabricating such additional components are essentially identical to those undertaken in the fabrication of those components of the prior art head depicted in FIG. 2, and the components are identically numbered for ease of comprehension. It is to be further understood that it is also possible to place the heating element at different locations in the head, for example, in the write gap 72, where only the method of fabrication may change.

It is therefore to be understood that the significant features of the present invention are the fabrication of the diffusion barrier layer and/or adhesion layer below, between and/or above the heating element and lead layers of the media heating device, that serve as diffusion barriers and/or adhesion layers for the heating device and for magnetic head components that are fabricated below or above the heating device. The diffusion barrier layers serve to primarily prevent the diffusion of the metallic materials that comprise the heating device into the magnetic head layers that are deposited adjacent to the heating device. The adhesion layers serve to promote the adhesion of the metallic heater device layers with the magnetic head layers that are deposited beneath and above the heating device. The diffusion barrier and adhesion layers of the present invention therefore serve to create an improved, more reliable magnetic head in which the contamination of layers adjacent to the heating device and the delamination of the magnetic head proximate the heating device are inhibited.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention. Further, Applicant's intent is to encompass the equivalents of all claim elements, and no amendment to any claim in the present application should be construed as a disclaimer of any interest in or right to an equivalent of any element or feature of the amended claim.

What is claimed is:

1. A magnetic head, comprising:

a write head portion including components that are adapted for writing data to a magnetic media hard disk;

a media heating device including heating device components including a heating element and at least one electrical lead, and being disposed proximate said write head portion to heat portions of said magnetic media disk prior to the writing of data thereon;

said media heating device further including at least one metallic material diffusion barrier layer being disposed beneath said heating device components, between said heating device components or above said heating device components.

2. A magnetic head as described in claim 1 wherein said heating element comprises an optical element.

3. A magnetic head as described in claim 1 wherein said media heating device further includes at least one adhesion layer being disposed beneath said heating device components, between said heating device components or above said heating device components.

4. A magnetic head as described in claim 3 wherein said diffusion barrier layer and said adhesion layer are composed of the same material.

5. A magnetic head as described in claim 1 wherein said diffusion barrier layer is composed of a material selected from the group consisting of tantalum, tantalum nitride, other tantalum alloys, titanium, rhodium and ruthenium.

6. A magnetic head as described in claim 3 wherein said adhesion layer is composed of a material selected from the group consisting of tantalum, tantalum nitride, tantalum oxide, other tantalum alloys, titanium, nickel iron, chromium, platinum alloys, nickel alloys and aluminum oxide.

7. A magnetic head as described in claim 1 wherein said diffusion barrier layer blocks metallic material from diffusing therethrough and is disposed upon an electrical insulation layer.

8. A magnetic head as described in claim 1 wherein an electrical insulation layer is disposed upon said diffusion barrier layer.

9. A magnetic head, comprising:

a write head portion including components that are adapted for writing data to a magnetic media hard disk;

a media heating device including heating device components including a heating element and at least one electrical lead, and being disposed proximate said write head portion to heat portions of said magnetic media disk prior to the writing of data thereon;

said media heating device further including at least one adhesion layer being disposed beneath said heating device components, between said heating device components or above said heating device components.

10. A magnetic head as described in claim 9 wherein said heating element comprises an optical element.

11. A magnetic head as described in claim 9 wherein said media heating device further includes at least one diffusion barrier layer being disposed beneath said heating device components, between said heating device components or above said heating device components.

12. A magnetic head as described in claim 9 wherein said adhesion layer is composed of a material selected from the group consisting of tantalum, tantalum nitride, tantalum oxide, other tantalum alloys, titanium, nickel iron, chromium, platinum alloys, nickel alloys and aluminum oxide.

13. A magnetic head as described in claim 9 wherein said adhesion layer is disposed upon an electrical insulation layer.

14. A magnetic head as described in claim 9 wherein an electrical insulation layer is disposed upon said adhesion layer.

15. A hard disk drive, comprising:

a motor for rotating a spindle;

a magnetic media hard disk mounted on said spindle;

an actuator assembly including a magnetic head, said magnetic head including:

a write head portion including components that are adapted for writing information to said magnetic media hard disk;

a media heating device including heating device components including a heating element and at least one electrical lead, and being disposed proximate said write head portion to heat portions of said magnetic media disk prior to the writing of information thereon;

said media heating device further including at least one metallic material diffusion barrier layer being disposed beneath said heating device components, between said heating device components or above said heating device components.

16. A magnetic head as described in claim 15 wherein said heating element comprises an optical element.

17. A hard disk drive as described in claim 15 wherein said media heating device further includes at least one adhesion layer being disposed beneath said heating device components, between said heating device components or above said heating device components.

18. A hard disk drive as described in claim 17 wherein said diffusion barrier layer and said adhesion layer are composed of the same material.

19. A hard disk drive as described in claim 15 wherein said diffusion barrier layer is composed of a material selected from the group consisting of tantalum, tantalum nitride, other tantalum alloys, titanium, rhodium and ruthenium.

20. A hard disk drive as described in claim 17 wherein said adhesion layer is composed of a material selected from the group consisting of tantalum, tantalum nitride, tantalum oxide, other tantalum alloys, titanium, nickel iron, chromium, platinum alloys, nickel alloys and aluminum oxide.

21. A hard disk drive as described in claim 15 wherein said diffusion barrier layer is disposed upon an electrical insulation layer.

22. A hard disk drive as described in claim 15 wherein an electrical insulation layer is disposed upon said diffusion barrier layer device.

23. A hard disk drive, comprising:

a motor for rotating a spindle;

a magnetic media hard disk mounted on said spindle;

an actuator assembly including a magnetic head, said magnetic head including:

a write head portion including components that are adapted for writing information to said magnetic media hard disk;

a media heating device including heating device components including a heating element and at least one electrical lead, and being disposed proximate said write head portion to heat portions of said magnetic media disk prior to the writing of information thereon;

said media heating device having components including a heating element and at least one electrical lead;

said media heating device further including at least one adhesion layer being disposed beneath said heating device components, between said heating device components or above said heating device components.

24. A hard disk drive as described in claim 23 wherein said adhesion layer is composed of a material selected from the group consisting of tantalum, tantalum nitride, tantalum oxide, other tantalum alloys, titanium, nickel iron, chromium, platinum alloys, nickel alloys and aluminum oxide.

\* \* \* \* \*